(12) United States Patent
Sweatt et al.

(10) Patent No.: US 12,535,245 B2
(45) Date of Patent: Jan. 27, 2026

(54) GAS FUELED WATER HEATER APPLIANCE AND METHODS TO MITIGATE LINT, DUST, AND OIL EVENTS

(71) Applicant: Haier US Appliance Solutions, Inc., Wilmington, DE (US)

(72) Inventors: Corey Sweatt, Palmyra, IN (US); Michael Champion, Louisville, KY (US); Gary Elder, Louisville, KY (US); Jacob Strader, La Grange, KY (US); Subbu Thenappan, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 184 days.

(21) Appl. No.: 18/466,490

(22) Filed: Sep. 13, 2023

(65) Prior Publication Data

US 2025/0085021 A1 Mar. 13, 2025

(51) Int. Cl.
*F24H 1/18* (2022.01)
*F24H 9/20* (2022.01)
*F24H 15/25* (2022.01)

(52) U.S. Cl.
CPC ........... *F24H 1/186* (2013.01); *F24H 9/2035* (2013.01); *F24H 15/25* (2022.01)

(58) Field of Classification Search
CPC ........ F24H 1/186; F24H 15/25; F24H 9/2035; F24H 15/174; F24H 15/254
See application file for complete search history.

(56) References Cited

U.S. PATENT DOCUMENTS

| 7,438,023 | B2 | 10/2008 | Lee et al. |
| 8,333,584 | B2 | 12/2012 | Cook |
| 2007/0284000 | A1 * | 12/2007 | Lee .................... F23N 5/102 137/66 |

FOREIGN PATENT DOCUMENTS

CN 114963556 A * 8/2022 ........... F24H 9/2014

OTHER PUBLICATIONS

English translation of CN-114963556-A, dated Jul. 25, 2025 (Year: 2025).*

* cited by examiner

*Primary Examiner* — Edelmira Bosques
*Assistant Examiner* — Brett Peterson Mallon
(74) *Attorney, Agent, or Firm* — Dority & Manning, P.A.

(57) ABSTRACT

The gas fueled water heater appliance may include a tank, a chamber wall, a gas burner, a chamber sensor, and a controller. The chamber sensor may be configured to detect temperature within the combustion chamber. The controller may be mounted to the gas fueled water heater appliance in operable communication with the gas burner and the chamber sensor. The controller may be configured to direct a water heating operation. The water heating operation may include detecting an ambient temperature (AT) value during a contemporaneous cycle of the gas burner, selecting, based on the detected AT value, a set temperature threshold from a plurality of temperature thresholds, detecting a combustion chamber temperature (CCT) value at the chamber sensor during the contemporaneous cycle, comparing the detected CCT value to the set temperature threshold, and directing heating at the gas burner based on comparing the detected CCT value to the set temperature threshold.

16 Claims, 6 Drawing Sheets

GAS FUELED WATER HEATER APPLIANCE AND METHODS TO MITIGATE LINT, DUST, AND OIL EVENTS

FIELD OF THE DISCLOSURE

The present subject matter relates generally to water heater appliances, and more particularly to systems and methods for improved operation.

BACKGROUND OF THE DISCLOSURE

A variety of energy sources are used in creating hot water for commercial and residential use including electric, solar, and various fuels. Natural gas and propane are preferred by some customers due to, for example, the relatively quick heating rate. These fuels are supplied as a gas that is burned in a combustion chamber to provide heat energy to raise the water temperature.

If the water heater is, for example, installed in a dusty area containing above average levels of contaminant (e.g., lint, dust, or oil) the air intake of water heater can become clogged. The lack of enough air can cause the temperature of the combustion chamber to become too hot. As another example, a flammable vapor event such as the ignition of vapor from liquid fuel present near the water heater can also create elevated temperatures in the water heater combustion chamber.

Accordingly, it is desirable to monitor temperature and terminate the combustion process if the temperature becomes excessive. One conventional approach is the use of a bi-metal switch placed in direct contact with the wall of the combustion chamber so as to activate the switch. The metals of the bi-metal switch have different thermal expansion characteristics. Once the temperature of the bi-metal switch reaches a predetermined maximum temperature, the switch is activated so as to cause a control system to close off the flow of gas-even if the temperature is only high for a relatively short period of time. Due to its limited design, such switches may lead to a number of inaccurate or nuisance activations, particularly if the increased temperature was not due to a unwanted event such as clogging of the air flow.

Additionally or alternatively, because a bi-metal switch must be placed in contact with the combustion chamber wall, it does not provide a direct measurement of the temperature of the combustion process. Instead, heat must be transmitted to the wall of the combustion chamber before the bi-metal switch can be triggered due to an unsafe condition. Further additionally or alternatively, a bi-metal switch does not provide for multiple temperature measurements or adjustment of the temperature at which it is activated. Instead, the bi-metal switch is simply activated upon reaching a predetermined maximum temperature.

Accordingly, an improved system for measuring and monitoring the temperature of the combustion chamber of a gas water heater is needed.

BRIEF DESCRIPTION OF THE DISCLOSURE

Aspects and advantages of the invention will be set forth in part in the following description, or may be obvious from the description, or may be learned through practice of the invention.

In one exemplary aspect of the present disclosure, a gas fueled water heater appliance is provided. The gas fueled water heater appliance may include a tank, a chamber wall, a gas burner, a chamber sensor, and a controller. The chamber wall may define a combustion chamber. The gas burner may be positioned adjacent to the tank and within the combustion chamber to heat the water in the tank. The chamber sensor may be attached to the chamber wall. The chamber sensor may be configured to detect temperature within the combustion chamber. The controller may be mounted to the gas fueled water heater appliance in operable communication with the gas burner and the chamber sensor. The controller may be configured to direct a water heating operation. The water heating operation may include detecting an ambient temperature (AT) value during a contemporaneous cycle of the gas burner, selecting, based on the detected AT value, a set temperature threshold from a plurality of temperature thresholds, detecting a combustion chamber temperature (CCT) value at the chamber sensor during the contemporaneous cycle, comparing the detected CCT value to the set temperature threshold, and directing heating at the gas burner based on comparing the detected CCT value to the set temperature threshold.

In another exemplary aspect of the present disclosure, a method of operating a gas fueled water heater appliance is provided. The method may include detecting an ambient temperature (AT) value during a contemporaneous cycle of the gas burner. The method may further include selecting, based on the detected AT value, a set temperature threshold from a plurality of temperature thresholds. The method may still further include detecting a combustion chamber temperature (CCT) value at the chamber sensor during the contemporaneous cycle. The method may yet further include comparing the detected CCT value to the set temperature threshold, and directing heating at the gas burner based on comparing the detected CCT value to the set temperature threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
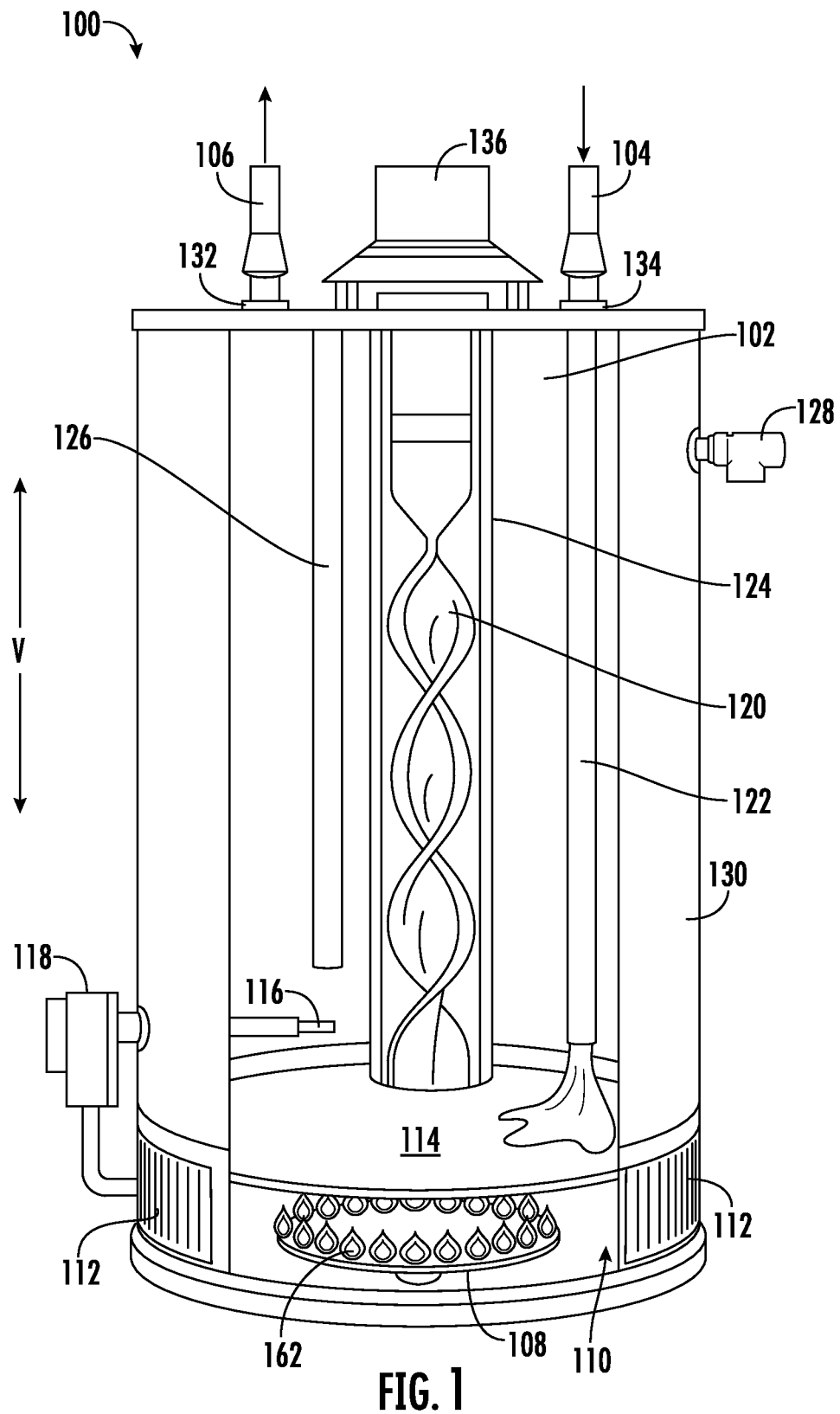
FIG. 1 provides a partially cut away, side view of an exemplary embodiment of a water heater of the present invention.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one element or component from another and are not intended to signify location or importance of the individual elements or components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Except as explicitly indicated otherwise, recitation of a singular processing element (e.g., "a controller," "a processor," "a microprocessor," etc.) is understood to include more than one processing element. In other words, "a processing element" is generally understood as "one or more processing element." Furthermore, barring a specific statement to the contrary, any steps or functions recited as being performed by "the processing element" or "said processing element" are generally understood to be capable of being performed by "any one of the one or more processing elements." Thus, a first step or function performed by "the processing element" may be performed by "any one of the one or more processing elements," and a second step or function performed by "the processing element" may be performed by "any one of the one or more processing elements and not necessarily by the same one of the one or more processing elements by which the first step or function is performed." Moreover, it is understood that recitation of "the processing element" or "said processing element" performing a plurality of steps or functions does not require that at least one discrete processing element be capable of performing each one of the plurality of steps or functions.

FIG. 1 illustrates a partial sectional, side view of an exemplary water heater 100 of the present invention. Water heater 100 includes a tank 102 where water is stored and heated. Water is supplied to tank 102 by inlet line 104. Heated water is supplied by tank 102 through outlet line 106. Water heater 100 is fluidly connected with lines 104 and 106 using connections 132 and 134. In turn, lines 104 and 106 connect with the water supply system of, for example, a residence or a commercial structure.

From line 104, water travels into tank 102 through a cold water dip tube 122 that extends along vertical direction V towards the bottom 114 of tank 102. After being heated, water exits tank 102 by travelling vertically upward and out through outlet line 106. Anode rod 126 provides protection against corrosion attacks on tank 102 and other metal components of water heater 100. A pressure relief valve 128 provides for a release of water from tank 102 in the event the pressure rises above a predetermined amount.

Water heater 100 includes a combustion chamber 110 in which a gas burner 108 is centrally located. Gas burner 108 is supplied with a gaseous fuel (e.g., propane or natural gas). Air travels into combustion chamber 110 through air intake 112 in cabinet 130. The resulting mixture of air and gas is ignited and burned to heat bottom 114 of tank 102 and its water contents. Hot combustion gas exits combustion chamber 110 through a vent or flue 124 centrally located within tank 102. Heat exchange with flue 124 also helps heat water in tank 102. A baffle 120 promotes this heat exchange. Gas exits water heater 100 though vent hood 136, which may be connected with additional vent piping (not shown).

A thermostat 116 measures the temperature of water in tank 102 and provides a signal to gas control valve module 118. As used herein, "a signal" is not limited to a single measurement of temperature and, instead, may include multiple measurements over time or continuous measurements over time. The signal may be provided through, for example, changes in current, voltage, resistance, or others. Depending upon whether the desired temperature has been reached as determined (e.g., from the signal from thermostat 116), gas control valve module 118 regulates the flow of gas to burner 108.

Figure 2:
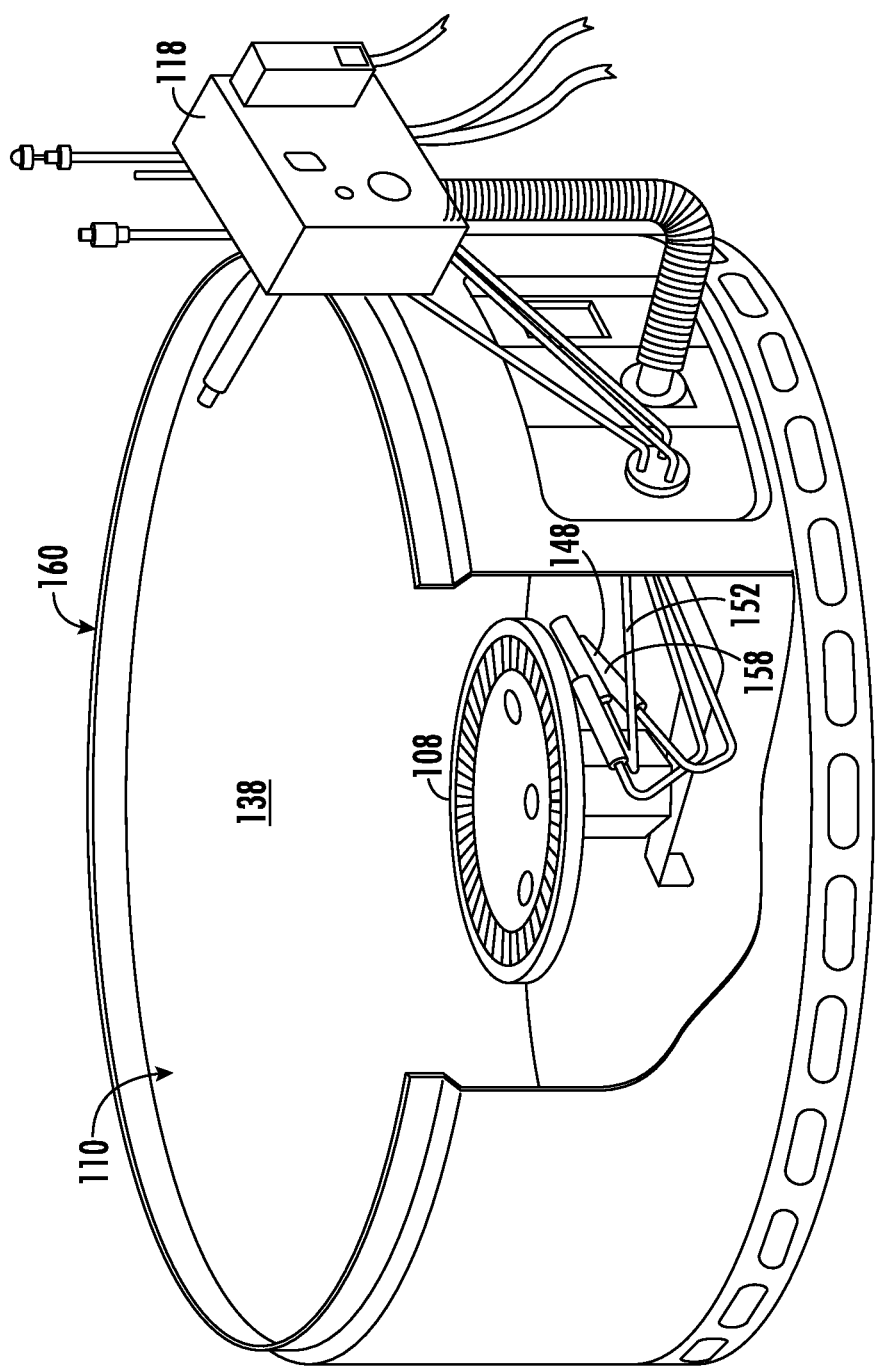
FIG. 2 provides a perspective view of an exemplary gas combustion chamber as may be used with the exemplary water heater of FIG. 1.
Figure 3A:
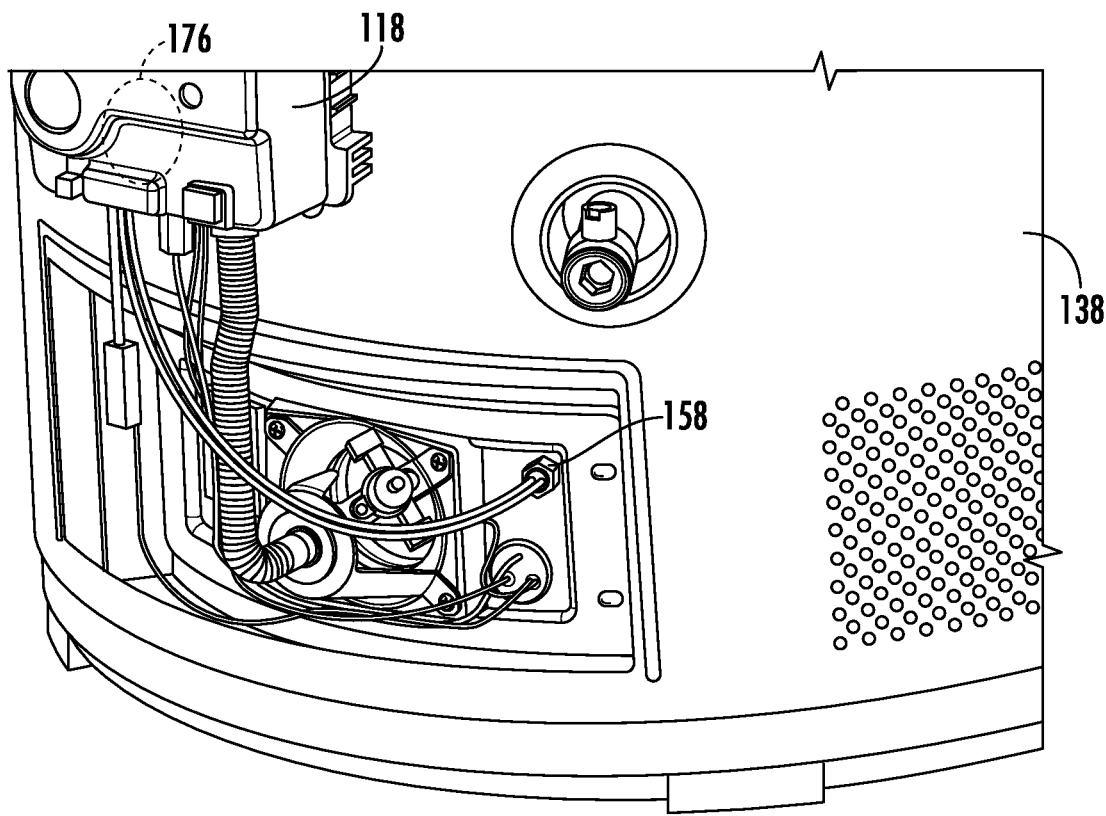
FIG. 3A provides a perspective view of certain exemplary components positioned adjacent to a combustion chamber as may be used with the exemplary water heater of FIG. 1.
Figure 3B:
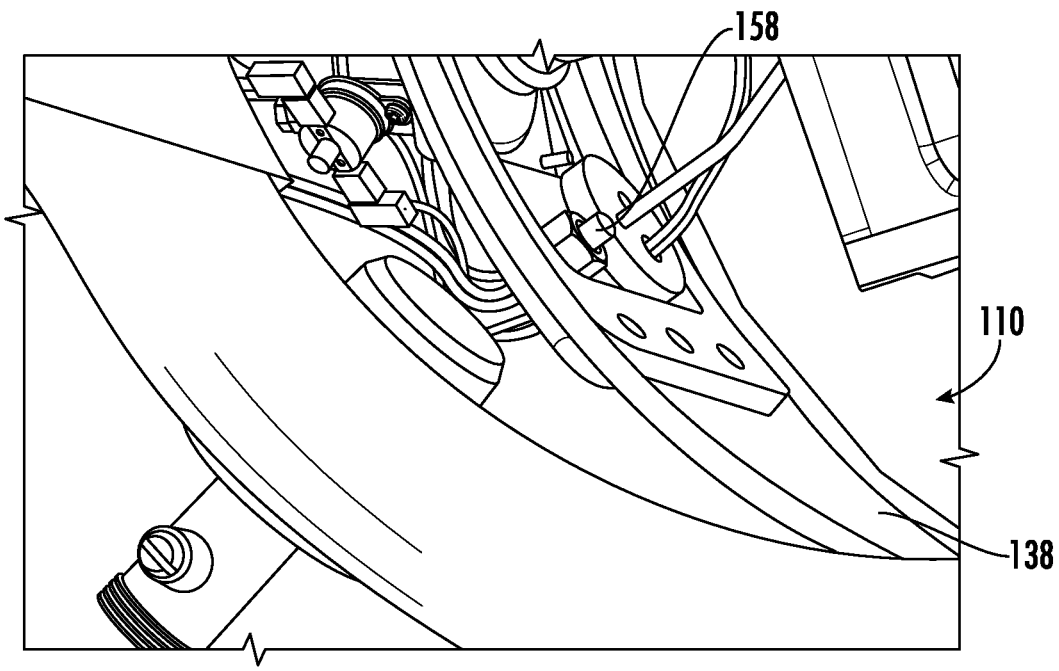
FIG. 3B provides another perspective view of certain exemplary components positioned adjacent to a combustion chamber as may be used with the exemplary water heater of FIG. 1.

Referring now to FIG. 2, combustion chamber 110 is formed by a chamber wall 138 that at least partially encloses combustion chamber 110 and may also provide support for tank 102 along top edge 160. As shown, chamber wall 138 encircles burner 108 and is spaced apart from burner 108. Chamber wall 138 may be part of cabinet 130 (FIG. 1) or may be a separate component.

Figure 4:
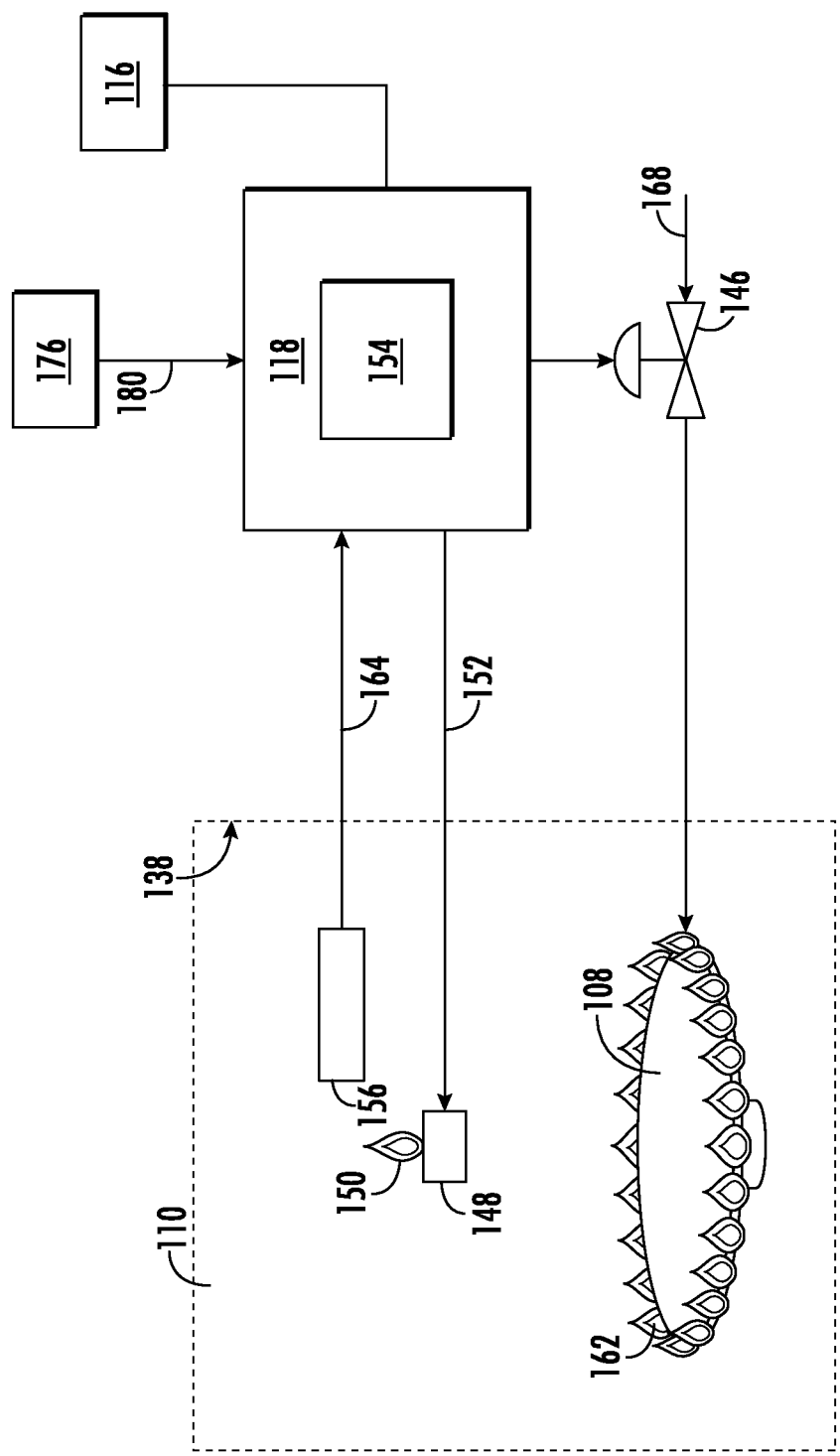
FIG. 4 is a schematic of a gas flow control system as may be used with the exemplary water heater of FIG. 1.

Turning especially to FIGS. 2 through 4, FIGS. 3A and 3B provide close-up perspective views of certain components positioned beneath and directly adjacent to gas burner 108. FIG. 4 provides a schematic representation of combustion chamber 110 and certain other components as will be further described.

In certain embodiments, gas valve control module 118 includes at least one controller 154. By way of example, controller 154 may include memory and one or more processing devices such as microprocessors, CPUs or the like, such as general or special purpose microprocessors operable to execute programming instructions or micro-control code associated with operation of water heater 100 as further described herein. The memory can represent random access memory such as DRAM, or read only memory such as ROM or FLASH. The processor executes programming instructions stored in the memory. The memory can be a separate component from the processor or can be included onboard within the processor. Alternatively, controller 154 may be constructed without using a microprocessor (e.g., using a combination of discrete analog or digital logic circuitry—such as switches, amplifiers, integrators, comparators, flip-flops, AND gates, and the like) to perform control functionality instead of relying upon software.

As shown, water heater 100 includes a pilot burner 148 that provides a pilot light 150 (FIG. 4) to ignite a mixture of air and fuel at burner 108 when a gas valve 146 is open. An igniter 158 is positioned adjacent to pilot burner 148 and generates a spark used to ignite gaseous fuel and provide pilot light 150. Gaseous fuel for pilot burner 108 is supplied by pilot burner fuel line 152. Gas valve control module 118 with controller 154 controls the flow of gaseous fuel through pilot burner fuel line 152 and the flow of gas to burner 108 from gaseous fuel supply 168.

In some embodiments, a chamber sensor 156, which is generally configured to detect temperature, is positioned at or adjacent to the combustion chamber 110. For instance, chamber sensor 156 may be attached to chamber wall 138 (e.g., supported thereon). As shown, chamber sensor 156 may be disposed, at least in part, within combustion chamber 110. Generally, chamber sensor 156 may be any suitable temperature sensor (e.g., thermocouple, thermistor, IR sensor, etc.) configured to detect a temperature within combustion chamber 110 (e.g., as a signal or voltage corresponding to a combustion chamber temperature (CCT) value). For instance, an output voltage from chamber sensor 156 may be proportional to the temperature or CCT value within the combustion chamber 110 or at chamber sensor 156. The voltage signal transmitted to controller 154 (e.g., and interpreted thereby) through conductors may thus represent representing the measured CCT value.

Further separate from or in addition to chamber sensor 156, water heater 100 may include an ambient sensor 176. Ambient sensor 176 may be spaced apart from chamber sensor 156. In some embodiments, ambient sensor 176 is attached to the tank 102, such as indirectly or through the gas valve control module 118 (e.g., such that the ambient sensor 176 is generally fixed relative to the tank 102). For instance, ambient sensor 176 may be disposed within module 118 on or in operable (e.g., electrical or wireless) communication with controller 154. Generally, ambient sensor 176 is configured to detect temperature outside of the chamber 110 (e.g., directly or indirectly). In particular, ambient sensor 176 may be configured to detect an ambient temperature outside of combustion chamber 110 (e.g., as a voltage or corresponding ambient temperature (AT) value). In some such embodiment, ambient sensor 176 includes or is provided as a suitable temperature sensor (e.g., thermocouple, thermistor, IR sensor, etc.) configured to detect temperate outside of combustion chamber 110. For instance, an output voltage from ambient sensor 176 may be proportional to the temperature or AT value. The voltage signal transmitted to controller 154 (e.g., and interpreted thereby) through conductors 180 may thus represent representing the measured AT value. In additional or alternative embodiments, ambient sensor 176 communicates (e.g., wirelessly) with a separate probe or database (e.g., weather station) to receive an AT value detected apart from the tank 102 or water heater 100 generally.

In exemplary embodiments, water heater 100 includes a gas valve 146 positioned along main gas supply line 168. Controller 154 is in communication with gas valve 146 to control the flow of gas therethrough by determining when valve 146 is energized. For this exemplary embodiment, gas valve 146 may operate so that when energized, valve 146 is fully open to allow a flow of gaseous fuel to burner 108. When not fully energized, valve 146 is fully closed (i.e. a "fail-closed" type valve) so as to prevent the flow of gaseous fuel to burner 108.

During use, opening or closing of valve 146 may generally be directed or controlled by controller 154. For instance, valve 146 may be directed to the open position to create a flame 162 at burner 108. Controller 154 may receive one or more signals (e.g., from thermostat 116) to determine whether the temperature of water in tank 102 has reached a desired setpoint temperature. In response to the same, the controller 154 may direct the valve 146 to the closed position. In some embodiments, an open interval (i.e., time period in which gas valve 146 is continuously opened or flame 162 is generated) may be demarcated or observed as a single cycle.

Figure 6:
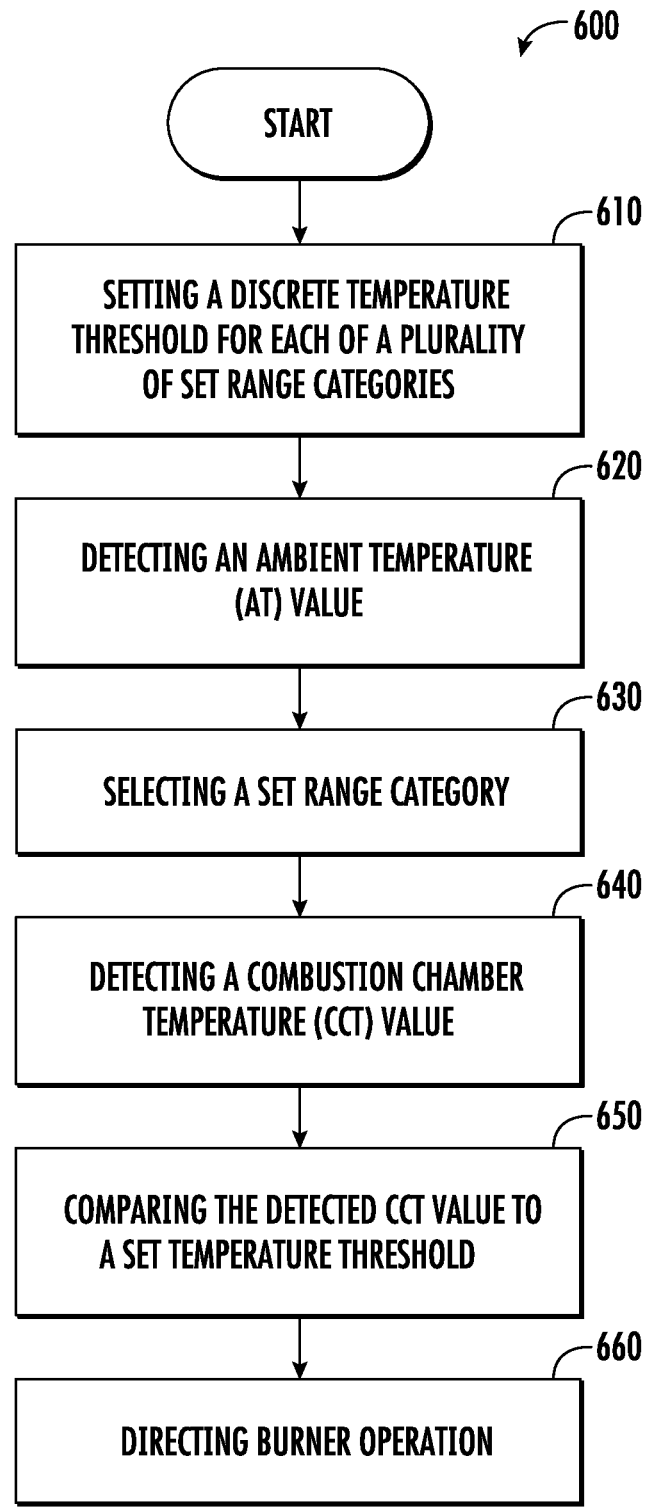
FIG. 6 provides a flow chart illustrating a method of operating a gas fueled water heater appliance according to exemplary embodiments of the present disclosure.

Turning now to FIG. 6, the present disclosure may further be directed to methods (e.g., method 600) of operating a gas fueled water heater appliance, such as water heater appliance 100. In exemplary embodiments, the controller 154 may be operable to perform various steps of a method in accordance with the present disclosure.

The methods (e.g., 600) may occur as, or as part of, a water heating operation of water heater appliance 100. In particular, the methods (e.g., 600) disclosed herein may accurately detect excess temperatures within a combustion chamber, such as to maintain desired or safe operation while avoiding inaccurate or nuisance trips. Moreover, such methods may account for variations in ambient conditions.

It is noted that the order of steps within method 600 are for illustrative purposes. Except as otherwise indicated, one or more steps in the below method 600 may be changed, rearranged, performed in a different order, or otherwise modified without deviating from the scope of the present disclosure.

As shown in FIG. 6, at 610, the method 600 includes setting a discrete temperature threshold for each of a plurality of set range categories. In particular, following installation, initial activation, or reset of the water heater appliance, multiple set range categories may have a corresponding temperature threshold be determined, calculated, or recorded.

Figure 5:
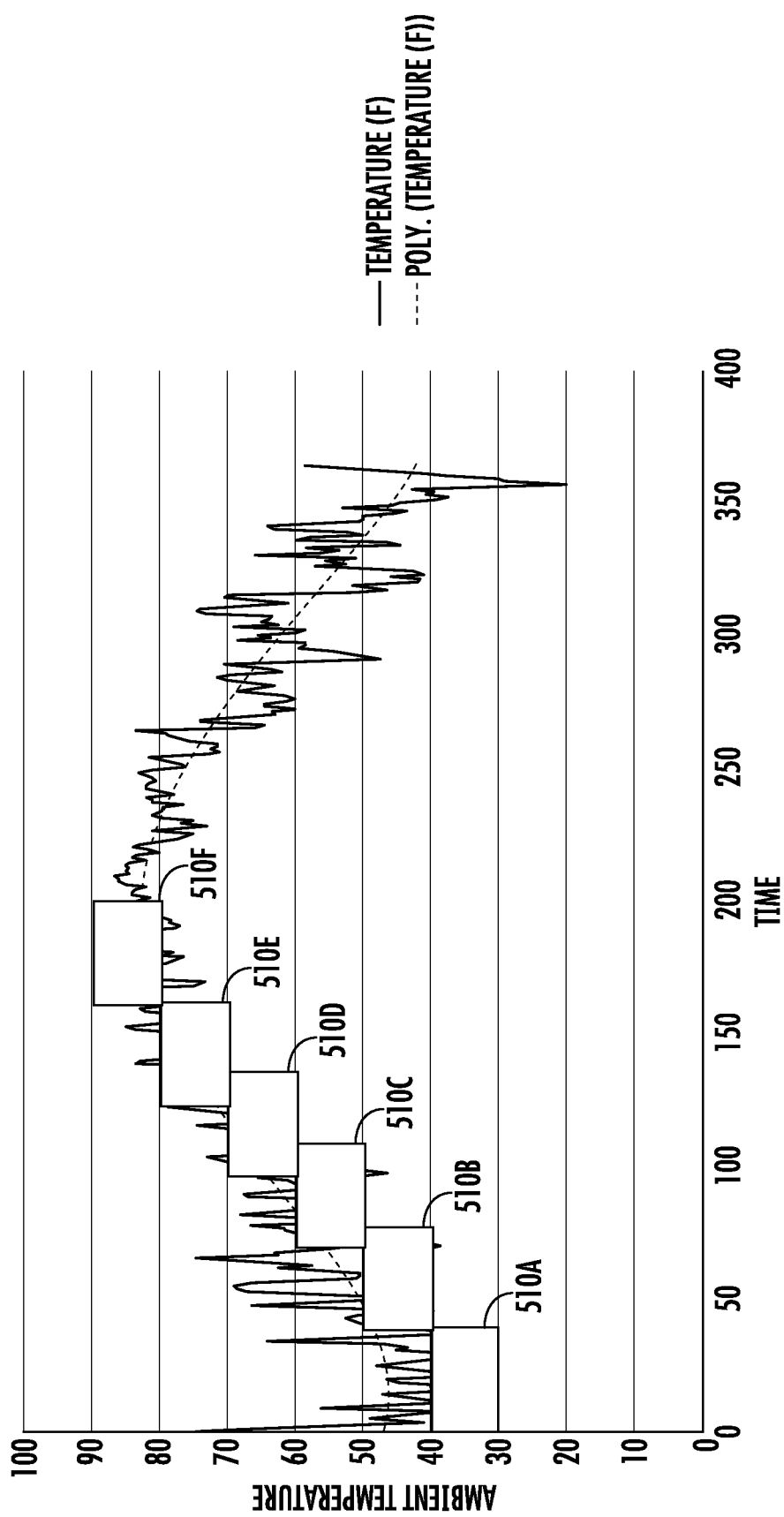
FIG. 5 provides an exemplary, representative plot of temperature measurements as further described herein.

Generally, the set range categories may each cover a predetermined or programmed interval or subsection from a larger range of a specific condition. For instance, and turning briefly to FIG. 5, multiple set range categories 510A, 510B, 510C, 510D, 510E, 510F may be provided for ambient temperature over each cycle of the burner. As shown, each of the range categories may correspond to a different interval or bin of AT values (e.g., detected or received over a cycle). In the illustrated embodiment, the range categories are set in intervals of 10° Fahrenheit (F), such that one (e.g., first) range category 510A covers or spans AT values of 30° F. to 40° F. another (e.g., second) range category 510B covers or spans AT values of 40° F. to 50° F., yet another (e.g., third) range category 510C covers or spans AT values of 60° F. to 70° F., etc. (e.g., range categories 510D, 510E, 510F). Nonetheless, it is noted that any suitable interval magnitude (e.g., one or more) may be provided to delineate each range category. Moreover, one or more range categories may be open-ended ranges (e.g., greater than or, alternatively, less than a programmed number).

Returning generally to FIG. 6, each of the range categories may be programmed to have a different or unique temperature threshold associated with the same. In other words, a first range category may be associated with a first temperature threshold; a second range category may be associated with a second temperature threshold; a third range category may be associated with a third temperature threshold; etc. As will be described in greater detail below, the temperature thresholds may relate to CCT values.

In order to set each temperature threshold, CCT values may be tracked over one or more preliminary cycles (e.g., relative to AT values) at the water heater appliance. For instance, CCT values may be tracked relative to AT values over multiple preliminary cycles. In some such embodiments, at least one (e.g., first) set temperature threshold may be determined for a (e.g., first) range category. In particular, a (e.g., first) preliminary AT value may be detected (e.g., at the ambient sensor) during a preliminary cycle of the burner. Once detected, the preliminary AT value may be used to select a corresponding range category (e.g., the range category in which the detected AT value falls). Thus, the corresponding range category may be selected according to the received preliminary AT value.

Simultaneously with or within the same preliminary cycle as detecting the preliminary AT value, the method 600 may include detecting a preliminary CCT value (e.g., maximum CCT value), such as at the chamber sensor. Subsequently, the detected preliminary CCT value may be recorded within the selected or corresponding range category. In other words, the preliminary CCT value may be associated with the corresponding range category (i.e., as a maximum CCT value detected while ambient conditions meet the corresponding range category). Based on the recorded preliminary CCT value, the (e.g., first) set temperature threshold may be calculated.

As an example, multiple preliminary cycles of the burner may be tracked (as described above) for the first set temperature threshold. Thus, multiple AT values may be detected while multiple preliminary CCT values are recorded and associated with the same corresponding range category. In other words, multiple recorded preliminary CCT values may be provided or placed within the same corresponding range category. Together, the multiple recorded preliminary CCT values may be used (e.g., as variables within a programmed formula, such as a mean formula calculating the average of the recorded preliminary CCT values within a range category) to calculate the set temperature threshold of the corresponding range category. Optionally, an offset coefficient may be provided to increase the set temperature threshold (e.g., above the calculated mean value of the recorded preliminary CCT values). Additionally or alternatively, the multiple preliminary cycles may be required to occur within a set time period (e.g., as measured in months, such as approximately 6 months, or, alternatively, in number of cycles), such as a set time period immediately following installation, initial activation, or reset of the water heater appliance.

Over multiple preliminary cycles, various temperature thresholds may be set to various corresponding range categories by repeating the above-described steps for tracking CCT values relative to AT values. In other words, some or all of the range categories may have empirically determined temperature thresholds. In some instances or embodiments, however, it may not be possible or desirable to empirically determine each temperature threshold beyond the first set temperature threshold (e.g., due to insufficient time or data). In some embodiments, one or more additional temperature thresholds of the plurality of temperature thresholds may be based on the set temperature threshold and a programmed coefficient (e.g., in degrees Fahrenheit). For instance, the programmed coefficient may be added to or subtracted from the first set temperature threshold to calculate a different set temperature threshold for a different range category (e.g., according to a factor of the position of the different range category relative to the first range category).

As an illustrative example of non-empirical setting of temperature thresholds, the multiple range categories may include a nil range category (C0) covering AT values less than 30° F., a first range category (C1) covering AT values between 30° F. and 40° F., a second range category (C2) covering AT values between 40° F. and 50° F., a third range category (C3) covering AT values between 50° F. and 60° F., a fourth range category (C4) covering AT values between 60° F. and 70° F., an a fifth range category (C3) covering AT values greater than 70° F. An empirically determined temperature threshold (T1) may be set for C1 and a programmed coefficient (E) (e.g., 15° F.) may be provided. The set temperature threshold (T0) of C0 may be calculated as (T0=T1−E). The set temperature threshold (T2) of C2 may be calculated as (T2=T1+E). The set temperature threshold (T3) of C3 may be calculated as (T3=T1+(2*E)). The set temperature threshold (T4) of C4 may be calculated as (T4=T1+(3*E)). The set temperature threshold (T5) of C5 may be calculated as (T5=T1+(4*E)).

Optionally, once each range category has been set or assigned a temperature threshold, the method 600 may close the range categories such that the temperature thresholds are fixed for further (e.g., future or contemporaneous) cycles of the burner.

At 620, the method 600 includes detecting an AT value during a contemporaneous cycle (e.g., following the preliminary cycles or setting of the temperature thresholds). Thus, during a contemporaneous cycle that occurs after the temperature thresholds are set, an AT value may be detected (e.g., at the ambient sensor). In other words, a (e.g., first) contemporaneous AT value may be detected (e.g., at the ambient sensor) during the contemporaneous cycle of the burner.

At 630, the method 600 includes selecting a set range category based on the detected AT value of 620. The contemporaneous AT value may be used to select a corresponding range category (e.g., the range category in which the detected AT value falls). Thus, 620 may include selecting, according to the detected AT value, a corresponding range category from the plurality of range categories. As noted above, each range category may correspond to its own predetermined AT range and may each have a corresponding set temperature threshold that is associated with the same. Thus, selecting the corresponding range category may include or provide for selecting a corresponding set temperature threshold (e.g., from a plurality of set temperature thresholds).

At 640, the method 600 includes detecting a CCT value. Specifically, 640 includes detecting a combustion chamber temperature (CCT) value at the chamber sensor the during the contemporaneous cycle (i.e., the same contemporaneous cycle as 620). In some embodiments, 640 includes detecting the contemporaneous CCT value (e.g., maximum CCT value) at the chamber sensor simultaneously with or within the same contemporaneous cycle as 620.

At 650, the method 600 includes comparing the received CCT value (e.g., of 640) to a set temperature threshold (e.g., from 610). For instance, the received CCT value of 640 may be compared to the set temperature threshold that corresponds to the range category selected at 630. Thus, it may be determined if at least one of two conditions exist. The first condition being the detected CCT value is greater than the set temperature threshold. The second condition being the detected CCT value is less than or equal to the set temperature threshold. Stated again, 650 may include determining the detected CCT value is greater than the set temperature threshold or, alternately, 650 may include determining the detected CCT value is less than or equal to the set temperature threshold.

At 660, the method 600 includes directing burner operation based on the comparison (i.e., 650). Thus, 650 may influence how, when, or if gas flows to the burner or how the flame is otherwise generated (e.g., permitted to generate) at the burner. As one example, 660 may include halting burner activation in response to determining the detected CCT value is greater than the set temperature threshold. For instance, the gas valve may be directed to close or the flame may otherwise be reduced or extinguished. Thus, highly elevated temperatures within the combustion chamber (e.g., relative to ambient conditions) may prompt the burner to stop generating further heat. As another example, 660 may include permitting burner activation in response to determining the detected CCT value is less than or equal to the set temperature threshold. For instance, the gas may be allowed to remain open according to one or more other operational algorithms (e.g., directing water within the tank to a set temperature as measured by a thermostat). Thus, relatively low or desirable temperatures within the combustion chamber (e.g., relative to the ambient conditions) may indicate regular or default operation is appropriate.

As would be understood, various steps may be repeated over the course of future operations or cycles. For instance, for each new contemporaneous cycle (or within the same contemporaneous cycle), the steps 620 through 660 may be repeated to promote safety or efficient performance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas fueled water heater appliance, comprising:
   a tank for storage of water for heating;
   a chamber wall defining a combustion chamber;
   a gas burner positioned adjacent to the tank and within the combustion chamber to heat the water in the tank;
   a chamber sensor attached to the chamber wall, the chamber sensor being configured to detect temperature within the combustion chamber; and
   a controller mounted to the gas fueled water heater appliance in operable communication with the gas burner, and the chamber sensor, the controller being configured to direct a water heating operation comprising
      detecting an ambient temperature (AT) value during a contemporaneous cycle of the gas burner,
      selecting, based on the detected AT value, a set temperature threshold from a plurality of temperature thresholds,
      detecting a combustion chamber temperature (CCT) value at the chamber sensor during the contemporaneous cycle,
      comparing the detected CCT value to the set temperature threshold, and
      directing heating at the gas burner based on comparing the detected CCT value to the set temperature threshold,
   wherein selecting the set temperature threshold comprises selecting, according to the detected AT value, a corresponding range category from a plurality of range categories, each range category corresponding to a predetermined AT range, and
   wherein each temperature threshold of the plurality of temperature thresholds corresponds to a discrete range category of the plurality of range categories,
   wherein the water heater operation further comprises determining, prior to the contemporaneous cycle, the set temperature threshold, determining the set temperature threshold comprising
      detecting a preliminary AT value during a preliminary cycle of the gas burner,
      selecting, according to the detected preliminary AT value, the corresponding range category from the plurality of range categories,
      detecting a preliminary CCT value during the preliminary cycle,
      recording the preliminary CCT value within the corresponding range category, and
      calculating the set temperature threshold based on the recorded preliminary CCT value.

2. The gas fueled water heater appliance of claim 1, further comprising:
   an ambient sensor spaced apart from the chamber sensor and attached to the tank, the ambient sensor being configured to detect temperature outside of the combustion chamber; wherein the AT value is detected at the ambient sensor during the contemporaneous cycle of the gas burner.

3. The gas fueled water heater appliance of claim 1, wherein the calculated set temperature threshold is based on a plurality of preliminary cycles within a set time period.

4. The gas fueled water heater appliance of claim 1, wherein the water heating operation further comprises calculating one or more additional temperature thresholds of the plurality of temperature thresholds based on the set temperature threshold and a programmed coefficient.

5. The gas fueled water heater appliance of claim 1, wherein comparing the detected CCT value to the set temperature threshold comprises
determining the detected CCT value is greater than the set temperature threshold, and wherein directing the water heater operation comprises halting burner activation in response to determining the detected CCT value is greater than the set temperature threshold.

6. The gas fueled water heater appliance of claim 1, wherein comparing the detected CCT value to the set temperature threshold comprises
determining the detected CCT value is less than or equal to the set temperature threshold, and wherein directing the water heater operation comprises permitting burner activation in response to determining the detected CCT value is less than or equal to the set temperature threshold.

7. A method of operating a gas fueled water heater appliance comprising a tank, a chamber wall defining a combustion chamber, a gas burner, and a chamber sensor, the method comprising:
detecting an ambient temperature (AT) value during a contemporaneous cycle of the gas burner;
selecting, based on the detected AT value, a set temperature threshold from a plurality of temperature thresholds;
detecting a combustion chamber temperature (CCT) value at the chamber sensor during the contemporaneous cycle;
comparing the detected CCT value to the set temperature threshold; and
directing heating at the gas burner based on comparing the detected CCT value to the set temperature threshold,
wherein selecting the set temperature threshold comprises selecting, according to the detected AT value, a corresponding range category from a plurality of range categories, each range category corresponding to a predetermined AT range, and
wherein each temperature threshold of the plurality of temperature thresholds corresponds to a discrete range category of the plurality of range categories,
wherein the method further comprises determining, prior to the contemporaneous cycle, the set temperature threshold, determining the set temperature threshold comprising
detecting a preliminary AT value during a preliminary cycle of the gas burner,
selecting, according to the detected preliminary AT value, the corresponding range category from the plurality of range categories,
detecting a preliminary CCT value during the preliminary cycle,
recording the preliminary CCT value within the corresponding range category, and
calculating the set temperature threshold based on the recorded preliminary CCT value.

8. The method of claim 7, wherein the AT value is detected at an ambient sensor attached to the tank during the contemporaneous cycle of the gas burner.

9. The method of claim 7, wherein the calculated set temperature threshold is based on a plurality of preliminary cycles within a set time period.

10. The method of claim 7, further comprising:
calculating one or more additional temperature thresholds of the plurality of temperature thresholds based on the set temperature threshold and a programmed coefficient.

11. The method of claim 7, wherein comparing the detected CCT value to the set temperature threshold comprises
determining the detected CCT value is greater than the set temperature threshold, and wherein directing the water heater operation comprises halting burner activation in response to determining the detected CCT value is greater than the set temperature threshold.

12. The method of claim 7, wherein comparing the detected CCT value to the set temperature threshold comprises
determining the detected CCT value is less than or equal to the set temperature threshold, and wherein directing the water heater operation comprises permitting burner activation in response to determining the detected CCT value is less than or equal to the set temperature threshold.

13. A gas fueled water heater appliance, comprising:
a tank for storage of water for heating;
a chamber wall defining a combustion chamber;
a gas burner positioned within the combustion chamber to heat the water in the tank;
a chamber sensor configured to detect temperature within the combustion chamber;
an ambient sensor spaced apart from the chamber sensor, the ambient sensor being configured to detect temperature outside of the combustion chamber; and
a controller mounted to the gas fueled water heater appliance in operable communication with the gas burner, the ambient sensor, and the chamber sensor, the controller being configured to direct a water heating operation comprising
detecting an ambient temperature (AT) value at the ambient sensor during a contemporaneous cycle of the gas burner,
selecting, based on the detected AT value, a set temperature threshold from a plurality of temperature thresholds, selecting the set temperature threshold comprising selecting, according to the detected AT value, a corresponding range category from a plurality of range categories, each range category corresponding to a predetermined AT range,
detecting a combustion chamber temperature (CCT) value at the chamber sensor during the contemporaneous cycle,
comparing the detected CCT value to the set temperature threshold, and
directing heating at the gas burner based on comparing the detected CCT value to the set temperature threshold,
wherein each temperature threshold of the plurality of temperature thresholds corresponds to a discrete range category of the plurality of range categories,
wherein the water heater operation further comprises determining, prior to the contemporaneous cycle, the set temperature threshold, determining the set temperature threshold comprising
detecting a preliminary AT value during a preliminary cycle of the gas burner, selecting, according to the detected preliminary ΔT value, the corresponding range category from the plurality of range categories, detecting a preliminary CCT value during the preliminary cycle, recording the preliminary CCT value within the corresponding range category, and calculating the set temperature threshold based on the recorded preliminary CCT value and a plurality of preliminary cycles within a set time period.

14. The gas fueled water heater appliance of claim 13, wherein the water heating operation further comprises calculating one or more additional temperature thresholds of the plurality of temperature thresholds based on the set temperature threshold and a programmed coefficient.

15. The gas fueled water heater appliance of claim 13, wherein comparing the detected CCT value to the set temperature threshold comprises determining the detected CCT value is greater than the set temperature threshold, and wherein directing the water heater operation comprises halting burner activation in response to determining the detected CCT value is greater than the set temperature threshold.

16. The gas fueled water heater appliance of claim 13, wherein comparing the detected CCT value to the set temperature threshold comprises determining the detected CCT value is less than or equal to the set temperature threshold, and wherein directing the water heater operation comprises permitting burner activation in response to determining the detected CCT value is less than or equal to the set temperature threshold.

* * * * *